US009816637B2

United States Patent
Brouwer et al.

(10) Patent No.: US 9,816,637 B2
(45) Date of Patent: Nov. 14, 2017

(54) TESTING CAP FOR A VALVE BODY

(71) Applicant: Kohler Co., Kohler, WI (US)

(72) Inventors: Douglas J. Brouwer, Sheboygan, WI (US); Michael W. Smith, Plymouth, WI (US); Michael A. Niver, Plymouth, WI (US); Chad J. Cochart, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 93 days.

(21) Appl. No.: 14/728,585

(22) Filed: Jun. 2, 2015

(65) Prior Publication Data

US 2015/0260299 A1    Sep. 17, 2015

Related U.S. Application Data

(62) Division of application No. 13/802,163, filed on Mar. 13, 2013, now Pat. No. 9,334,971.

(51) Int. Cl.
*F16K 27/06* (2006.01)
*F16K 11/076* (2006.01)
(Continued)

(52) U.S. Cl.
CPC ............ *F16K 27/062* (2013.01); *E03C 1/023* (2013.01); *E03C 1/042* (2013.01); *E03C 1/0408* (2013.01);
(Continued)

(58) Field of Classification Search
CPC ...... F16K 35/06; F16K 27/062; F16K 5/0242; F16K 11/076; F16K 27/065; Y10T 137/87249
See application file for complete search history.

(56) References Cited

U.S. PATENT DOCUMENTS

| 1,240,734 | A | * | 9/1917 | Koeppe ................ B60R 25/042 |
|           |   |   |        | 137/384.2 |
| 2,145,114 | A |   | 9/1935 | Gibbs et al. |

(Continued)

FOREIGN PATENT DOCUMENTS

| CN | 1093649 C | 10/1994 |
| EP | 0 358 317 A2 | 3/1990 |

(Continued)

OTHER PUBLICATIONS

Chinese Office Action dated Nov. 20, 2015, from related Chinese patent application No. 201410087907.6.
(Continued)

*Primary Examiner* — Atif Chaudry
(74) *Attorney, Agent, or Firm* — Foley & Lardner LLP

(57) ABSTRACT

A testing cap for a valve body includes a base configured to releasably attach to the valve body and to cover an opening in the valve body. The opening is configured to receive a valve cartridge and the base covers the opening in place of the valve cartridge. The testing cap includes a structure extending from the base. The structure is configured to be oriented relative to the valve body in a first orientation and a second orientation. The structure allows fluid to enter the valve body through an inlet port in the valve body and exit the valve body through an outlet port in the valve body when the structure is oriented in the first orientation. The structure covers at least one of the inlet port and the outlet port when the structure is oriented in the second orientation, thereby preventing fluid flow through the valve body.

20 Claims, 10 Drawing Sheets

(51) Int. Cl.
| | | |
|---|---|---|
| F16K 35/06 | (2006.01) | |
| F16K 5/02 | (2006.01) | |
| F16K 39/02 | (2006.01) | |
| F16K 11/074 | (2006.01) | |
| E03C 1/042 | (2006.01) | |
| E03C 1/02 | (2006.01) | |
| F16K 31/60 | (2006.01) | |
| F16K 11/00 | (2006.01) | |
| F16K 11/044 | (2006.01) | |
| E03C 1/04 | (2006.01) | |
| F16K 1/20 | (2006.01) | |
| F16K 11/16 | (2006.01) | |
| F16K 27/02 | (2006.01) | |
| F16K 27/04 | (2006.01) | |
| F16K 11/20 | (2006.01) | |

(52) U.S. Cl.
CPC .......... *F16K 1/2007* (2013.01); *F16K 1/2014* (2013.01); *F16K 1/2021* (2013.01); *F16K 5/0242* (2013.01); *F16K 11/0445* (2013.01); *F16K 11/076* (2013.01); *F16K 11/0743* (2013.01); *F16K 11/163* (2013.01); *F16K 11/207* (2013.01); *F16K 19/00* (2013.01); *F16K 27/0263* (2013.01); *F16K 27/04* (2013.01); *F16K 27/065* (2013.01); *F16K 31/605* (2013.01); *F16K 35/06* (2013.01); *F16K 39/024* (2013.01); *Y10T 137/2683* (2015.04); *Y10T 137/5196* (2015.04); *Y10T 137/6011* (2015.04); *Y10T 137/7668* (2015.04); *Y10T 137/86493* (2015.04); *Y10T 137/86871* (2015.04); *Y10T 137/87249* (2015.04)

(56) References Cited

U.S. PATENT DOCUMENTS

| | | |
|---|---|---|
| 2,983,279 A | 5/1961 | Biermann |
| RE25,037 E | 9/1961 | Brazier |
| 3,385,321 A | 5/1968 | Ehrens et al. |
| 3,688,790 A | 9/1972 | Esten |
| 3,724,480 A | 4/1973 | Povalski et al. |
| 3,770,017 A | 11/1973 | Enterante |
| 3,794,075 A | 2/1974 | Stoll et al. |
| 3,823,737 A | 7/1974 | Szymanski |
| 3,865,130 A * | 2/1975 | Mullis .................. F16K 35/10 137/385 |
| 3,946,756 A | 3/1976 | Specht |
| 3,949,966 A * | 4/1976 | Fabish .................. F16K 3/34 251/206 |
| 3,987,819 A | 10/1976 | Scheuermann |
| 4,029,125 A | 6/1977 | Steydle |
| 4,095,610 A | 6/1978 | Priesmeyer |
| 4,121,761 A | 10/1978 | Nolden |
| 4,174,726 A | 11/1979 | Arnold et al. |
| 4,220,175 A | 9/1980 | Keller et al. |
| 4,284,097 A | 8/1981 | Becker |
| 4,381,073 A | 4/1983 | Gloor |
| 4,397,330 A | 8/1983 | Hayman |
| 4,511,120 A * | 4/1985 | Conley .................. F16K 5/045 251/288 |
| 4,516,753 A | 5/1985 | Thomsen |
| 4,609,007 A | 9/1986 | Uhl |
| 4,662,389 A | 5/1987 | Igbal |
| 4,681,140 A | 7/1987 | Hayman |
| 4,699,172 A | 10/1987 | MacDonald |
| 4,896,381 A | 1/1990 | Hutto |
| 4,901,916 A | 2/1990 | Avelov |
| 4,905,732 A | 3/1990 | Bright et al. |
| 4,915,295 A | 4/1990 | Pullen et al. |
| 4,923,092 A | 5/1990 | Kirschner et al. |
| 4,978,059 A | 12/1990 | Nicklas et al. |
| 4,981,156 A | 1/1991 | Nicklas et al. |
| 5,129,576 A | 7/1992 | Pullen et al. |
| 5,137,048 A | 8/1992 | Brattoli |
| 5,170,816 A | 12/1992 | Schnieders |
| 5,331,996 A | 7/1994 | Ziehm |
| 5,340,018 A | 8/1994 | MacDonald |
| 5,341,845 A | 8/1994 | Graber |
| 5,355,906 A | 10/1994 | Marty et al. |
| 5,425,394 A | 6/1995 | Clare |
| 5,433,378 A | 7/1995 | Orlandi |
| 5,441,075 A | 8/1995 | Clare |
| 5,501,244 A | 3/1996 | Shahriar |
| 5,505,225 A | 4/1996 | Niakan |
| 5,518,019 A | 5/1996 | Clare |
| 5,518,022 A | 5/1996 | Ziehm |
| 5,634,391 A | 6/1997 | Eady |
| 5,725,010 A | 3/1998 | Marty et al. |
| 5,730,171 A | 3/1998 | Niakan |
| 5,732,729 A | 3/1998 | Shieh |
| 5,807,983 A | 9/1998 | Jiang et al. |
| 5,829,469 A | 11/1998 | Sileno et al. |
| 5,845,674 A | 12/1998 | Clare |
| 5,893,386 A | 4/1999 | Caria et al. |
| 6,012,476 A | 1/2000 | Ko |
| 6,050,285 A | 4/2000 | Goncze et al. |
| 6,052,929 A | 4/2000 | Canadas |
| 6,123,094 A | 9/2000 | Breda |
| 6,161,567 A | 12/2000 | Ziehm |
| 6,196,268 B1 * | 3/2001 | Steiner .................. F16K 5/0242 137/625.47 |
| 6,237,622 B1 | 5/2001 | Cook et al. |
| 6,279,604 B1 | 8/2001 | Korb et al. |
| 6,283,447 B1 | 9/2001 | Fleet |
| 6,302,131 B1 | 10/2001 | Pitsch |
| 6,343,619 B1 | 2/2002 | Pruitt |
| 6,357,476 B1 | 3/2002 | Moretti |
| 6,378,911 B1 | 4/2002 | Grohe |
| 6,382,517 B1 | 5/2002 | Bommelaer et al. |
| 6,427,713 B1 | 8/2002 | Dempsey et al. |
| 6,484,949 B2 | 11/2002 | Procter |
| 6,546,948 B2 | 4/2003 | Tarzia |
| 6,561,548 B1 | 5/2003 | Mantel et al. |
| 6,718,569 B2 | 4/2004 | Burger et al. |
| 6,732,754 B2 | 5/2004 | Ottelli |
| 6,761,184 B1 | 7/2004 | Jordan |
| 6,832,396 B1 | 12/2004 | Lin |
| 6,845,785 B1 | 1/2005 | Condon |
| 6,877,523 B2 | 4/2005 | Dempsey et al. |
| 6,880,565 B2 | 4/2005 | Ouyoung |
| 7,021,337 B2 | 4/2006 | Markham |
| 7,063,098 B2 | 6/2006 | Sprague |
| 7,073,725 B2 | 7/2006 | Swadling |
| 7,077,150 B2 | 7/2006 | McNerney |
| RE39,257 E | 9/2006 | Kamimura et al. |
| 7,100,630 B2 | 9/2006 | Vu et al. |
| 7,163,157 B2 | 1/2007 | Gonecze et al. |
| 7,337,804 B2 | 3/2008 | Rosko |
| 7,344,088 B2 | 3/2008 | Yang |
| 7,509,971 B2 | 3/2009 | Kajuch |
| D621,479 S | 8/2010 | McNerney |
| 7,775,234 B2 | 8/2010 | Campisi |
| 7,775,450 B2 | 8/2010 | Warshawsky |
| 7,823,603 B2 | 11/2010 | Cochart et al. |
| 7,841,362 B2 | 11/2010 | Kim |
| 7,874,318 B2 | 1/2011 | Malone et al. |
| 8,162,001 B2 | 4/2012 | Yang |
| 8,176,934 B2 | 5/2012 | Niver |
| 8,408,239 B2 | 4/2013 | King |
| 2003/0213850 A1 | 11/2003 | Mayer et al. |
| 2004/0094214 A1 | 5/2004 | Ottelli |
| 2004/0261864 A1 | 12/2004 | Coll |
| 2005/0067017 A1 | 3/2005 | Condon et al. |
| 2006/0231140 A1 | 10/2006 | McNerney |
| 2008/0029156 A1 | 2/2008 | Rosal et al. |
| 2008/0053528 A1 | 3/2008 | Breda |
| 2009/0242051 A1 | 10/2009 | Xinlu et al. |
| 2009/0260696 A1 | 10/2009 | Cruickshank et al. |
| 2010/0006169 A1 | 1/2010 | Bolgar et al. |
| 2010/0058534 A1 | 3/2010 | Martin et al. |
| 2010/0212759 A1 | 8/2010 | Devries et al. |

(56) References Cited

U.S. PATENT DOCUMENTS

| | | | |
|---|---|---|---|
| 2011/0148093 A1* | 6/2011 | Choi | F16K 27/065 |
| | | | 285/32 |
| 2011/0265890 A1 | 11/2011 | Killian | |
| 2011/0266355 A1 | 11/2011 | Yang | |
| 2012/0180887 A1 | 7/2012 | Yan | |
| 2012/0279595 A1 | 11/2012 | Huck et al. | |

FOREIGN PATENT DOCUMENTS

| | | |
|---|---|---|
| GB | 2 424 465 A | 9/2006 |
| WO | WO 2010/069606 | 6/2010 |

OTHER PUBLICATIONS

Delta, MultiChoice Installation Instructions, 2011, 6 pages.
Hansgrohe, iBox Universal Plus, Planning and Installation, Mar. 2011, 26 pages.
Aquatite Wetwall Caddy Installation Instructions, 2005, 2 pages.

* cited by examiner

TESTING CAP FOR A VALVE BODY

CROSS-REFERENCE TO RELATED PATENT APPLICATION

This application is a division of U.S. application Ser. No. 13/802,163, filed Mar. 13, 2013, the entire disclosure of which is incorporated by reference herein.

BACKGROUND

The present application generally relates to a valve assembly for a fluid control device. More particularly, the present application relates to a valve assembly having a valve body, a temporary cap, a service valve, and a reversible aspirator.

Valve assemblies are used in a variety of plumbing fixtures for controlling the temperature and volume of water dispensed from the fixture. A valve assembly may receive hot water and cold water from separate supply lines and controllably mix the water to provide an output having an intermediate temperature. Installation of a valve assembly typically requires temporarily discontinuing the water pressure in the supply lines which connect to the valve assembly. Each time the valve assembly is changed, upgraded, or swapped for a different valve assembly, it may be necessary to stop the water pressure prior to removing the current valve assembly. Additionally, because valve assemblies are often non-uniform, specialized plumbing tools are often required for valve installation and removal.

A typical valve assembly may include a hot water inlet port, a cold water inlet port, and two outlet ports. One outlet port may direct flow to a shower fixture whereas the other outlet port may direct flow to a tub fixture. An aspirator is typically used to direct fluid flow to one of the two outlet ports. Typical aspirators are directional components built into the valve assembly. In other words, the aspirator may only function properly when the valve assembly is installed in a certain orientation (e.g., relative to a wall). This directionality may necessitate complicated plumbing arrangements within the wall to direct hot and cold water to the proper ports on the valve assembly if, for example, a water supply line approaches the valve assembly from a direction opposite the port to which it must connect.

SUMMARY

One implementation of the present disclosure is a universal valve body for a fluid control valve. The valve body may include a front face defining a plane and having a circular opening for receiving a valve cartridge, a rear face parallel to the plane, a frustoconical side wall connecting the front face to the rear face, and a first inlet port and a first outlet port. The rear face may be circular and smaller than the circular opening in the front face. In some embodiments, the universal valve body is configured to receive a valve cartridge selected from a set of interchangeable cartridges.

In some embodiments, both ports are obliquely disposed in the frustoconical side wall. In some embodiments, the first inlet port and first outlet port intersect the frustoconical side wall at approximately a 45° angle whereas in other embodiments the first inlet port and first outlet port intersect the frustoconical side wall at approximately a 75° angle. The first inlet port and first outlet port may be configured to receive and output fluid respectively in directions parallel to the plane.

In some embodiments, the valve body may further include a first recess configured to accept a first service valve. The first recess may be positioned in a fluid flow path upstream of the first inlet port. In some embodiments, the valve body may further include a second inlet port aligned with the first inlet port and configured to receive fluid in a direction opposite the first inlet port, a second outlet port aligned with the first outlet port and configured to output fluid in a direction opposite the first outlet port, and a second recess configured to accept a second service valve. The second recess may be positioned in a fluid flow path upstream of the second inlet port. The second inlet port and the second outlet port may be obliquely disposed in the frustoconical side wall respectively opposite the first inlet port and the first outlet port.

Another implementation of the present disclosure is a cap for a valve body. The cap may include a base having a first orientation and a second orientation relative to the valve body and a structure extending from the base. A first portion of the base may be configured to align the base to the valve body for releasably coupling the base to the valve body in the first orientation. A second portion of the base may be configured to align the base to the valve body for releasably coupling the base to the valve body in the second orientation. When the base is coupled to the valve body in the first orientation, fluid may enter the valve body through an inlet port in the valve body and exit the valve body through an outlet port in the valve body. When the base is coupled to the valve body in the second orientation, the structure extending from the base may cover at least one of the inlet port and the outlet port, thereby preventing fluid from flowing through the valve body. Coupling the base to the valve body in the first orientation may allow debris to be flushed out of a plumbing system fluidly connected to the valve body and coupling the base to the valve body in the second orientation may allow a pressure decay test to be performed on a plumbing system fluidly connected to the valve body. In some embodiments, the structure extending from the base has an angled portion tapering inward toward a central axis of the cap as the structure extends from the base. The angled portion of the structure extending from the base may be configured to align with an inner wall of the valve body when the cap is coupled to the valve body in either the first orientation or the second orientation. The angled portion of the structure extending from the base may be frustoconical and configured to align with a frustoconical portion of the valve body when the cap is coupled to the base in either the first orientation or the second orientation.

Another implementation of the present disclosure is a service valve for a valve body. The service valve may include a base rotatable between an open orientation and a closed orientation relative to the valve body and a tab extending from the base. In some embodiments, rotation of the base by 180 degrees rotates the base between the open orientation and the closed orientation. In some embodiments, the base is substantially cylindrical and the tab extends outward from a circular face of the cylindrical base and radially away from a longitudinal axis of the cylindrical base. When the base is in the open orientation, the tab may prevent removal of a cover from the valve body. For example, when the base is in the open orientation, the cover may be held between the valve body and the tab extending from the base. The cover may be a testing cap or valve cartridge for the valve body.

In some embodiments, the service valve further includes a bore extending through the base. When the base is in the open orientation, fluid may be permitted to flow through the bore into the valve body and when the base is in the closed orientation, fluid may be prevented from flowing through the bore into the valve body. In some embodiments, the service valve may be a one way valve. In some embodiments, the service valve may be a check valve, a stop valve, or a stop-check valve.

In some embodiments, the service valve further includes a retaining clip configured to releasably couple the service valve to the valve body. The retaining clip may be compressible between a compressed state and an expanded state. When the retaining clip is in the expanded state, the retaining clip may couple the service valve to the valve body and when the retaining clip is in the expanded state, the service valve may be removable from the valve body. In some embodiments, the retaining clip is shaped as a section of a circular arc and includes tabs extending from both endpoints of the arc in a direction transverse to a plane defined by the arc. The retaining clip may be compressible by exerting a force on one or both of the tabs extending from the arc. The force may be a compression force between the tabs. In some embodiments, the retaining clip is sufficiently elastic to automatically return to the expanded state when compressed into the compressed state. The retaining clip may be sufficiently elastic to automatically return to the expanded state after being compressed into the compressed state and the compression force is removed.

Another implementation of the present disclosure is an aspirator for a valve assembly. The aspirator may include a surface configured to direct fluid to a first outlet port of a valve body, a fluid channel configured to direct fluid to a second outlet port of the valve body, and a fastener configured to releasably couple the aspirator to a valve cartridge. The fluid channel may be parallel to the surface and the aspirator may be configured to receive fluid in a direction transverse to the surface.

In some embodiments the aspirator is configured to releasably couple to the valve cartridge in a first orientation and a second orientation. The aspirator may be rotated 180 degrees relative to the valve cartridge between the first orientation and the second orientation. For example, the aspirator may be configured to be removable from the valve cartridge in the first orientation and re-insertable into the valve cartridge in the second orientation, thereby allowing the valve cartridge to be rotated 180 degrees relative to the valve body while maintaining the aspirator in an unchanging orientation relative to the valve body.

When the aspirator is coupled to the valve cartridge in the first orientation, the aspirator may receive fluid from a first half of the valve cartridge, and when the aspirator is coupled to the valve cartridge in the second orientation, the aspirator may receive fluid from a second half of the valve cartridge. In some embodiments, the fluid channel has an angled end portion configured to align with an angled inner surface of the valve body. The angled end portion of the fluid channel may be frustoconical and configured to align with a frustoconical inner surface of the valve body.

Another implementation of the present disclosure is a valve assembly including a universal valve body, a cap, and a service valve. The valve body may include an inlet port, an outlet port, and a circular opening for receiving a valve cartridge selected from a set of interchangeable cartridges. The cap may be configured to releasably couple to the valve body for covering the circular opening in the valve body.

In some embodiments, the service valve has an open position and a closed position. When the service valve is in the open position, fluid may be permitted to flow through the service valve. When the service valve is in the closed position fluid may be blocked from flowing through the service valve. A tab extending from the service valve may prevent removal of the cap from the circular opening in the valve body when the service valve is in the open position.

In some embodiments, the cap has a first orientation and a second orientation relative to the valve body. When the cap is coupled to the base in the first orientation, fluid may be permitted to enter the valve body through the inlet port and exit the valve body through the outlet port. When the cap is coupled to the base in the second orientation, a portion of the cap may cover at least one of the inlet port and the outlet port, thereby preventing fluid from flowing through the valve body.

In some embodiments, the valve assembly may further include a reversible aspirator configured to releasably couple to the valve cartridge in a first orientation and a second orientation. The aspirator may be rotated 180 degrees relative to the valve cartridge between the first orientation and the second orientation.

Another implementation of the present disclosure is a valve assembly including a housing, a fluid control cartridge disposed in the housing, and an aspirator. The housing may have a first inlet port, a second inlet port, a first outlet port, and a second outlet port. The fluid control cartridge may be oriented in a first position if hot water is provided to the first inlet port and oriented in a second position if hot water is provided to the second inlet port. The aspirator may include a first channel configured to direct fluid from the fluid control cartridge to the first outlet port and a second channel configured to guide fluid from the fluid control cartridge to the second outlet port. The aspirator may be coupled to the fluid control cartridge in a first orientation when the fluid control cartridge is in the first position, and coupled to the fluid control cartridge in the second orientation when the fluid control cartridge is in the second position.

DETAILED DESCRIPTION

Figure 1A:
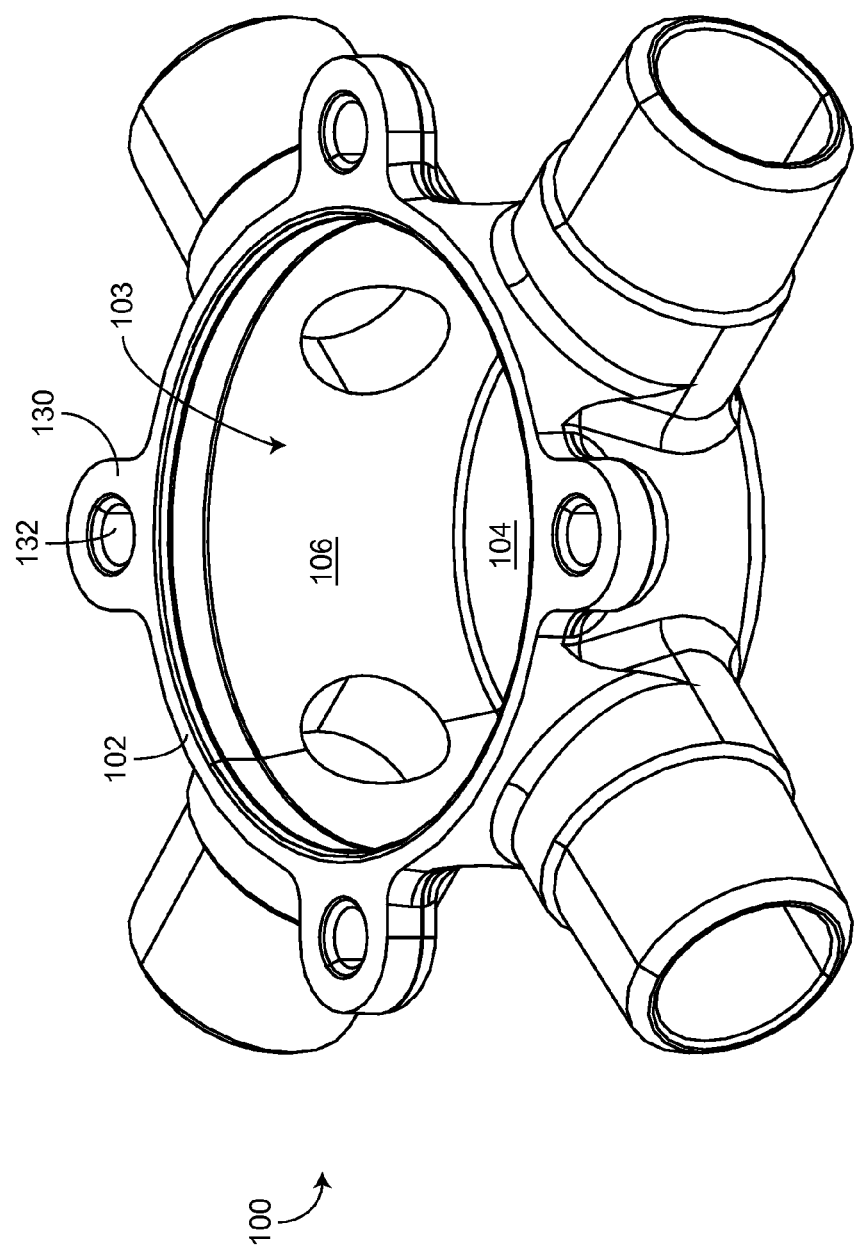
FIG. 1A is a perspective view of a universal valve body, according to an exemplary embodiment.

Referring to FIG. 1A, a perspective view of a universal valve body 100 is shown, according to an exemplary embodiment. Valve body 100 is shown to include a front face 102 having an opening 103, a rear face 104, a side wall 106, and flanges 130 having holes 132.

Valve body 100 may receive fluid from one or more fluid supply lines and output fluid via one or more output ports. Valve body 100 may be installed within a wall (e.g., in a wet wall containing hot and cold water lines) or otherwise connected to a plumbing system. Valve body 100 may function as an interface between one or more fluid supply lines (e.g., hot and cold water supply lines) and a user-operable valve cartridge for controlling fluid flow, volume, or temperature. In an exemplary embodiment, valve body 100 may receive hot and cold water from separate supply lines, transmit the hot and cold water to a valve cartridge, receive mixed water from the valve cartridge, and output the mixed water. The mixed water may then be dispensed from a tub, shower, faucet, or other plumbing fixture.

In some embodiments, valve body 100 may be made of brass. However, in other embodiments, valve body 100 may be constructed from other metals, polymers, ceramics, or any other suitable material. Valve body 100 may be forged, cast, molded, or otherwise created using any formation process, method, or technique. In some embodiments, valve body 100 may be symmetrical having one or more planes of symmetry. For example, valve body 100 may rotated by 90°, 180°, or 270° without sacrificing functionality.

Still referring to FIG. 1A, universal valve body 100 may include a front face 102. Face 102 may include an opening 103 for interfacing with a valve cartridge or other plumbing hardware. Advantageously, valve body 100 may be configured to accept a valve cartridge selected from a set of interchangeable cartridges, thereby allowing a user to upgrade to a newer valve cartridge, or a valve cartridge with different or improved functionality, without requiring installation of a new valve body. In an exemplary embodiment, opening 103 is circular. However, in other embodiments, opening 103 may be any shape, divided into multiple openings for interfacing with multiple valve cartridges, or may exist in faces other than front face 102 (e.g., rear face 104, side wall 106, etc).

In some embodiments, front face 102 may further include flanges 130. Flanges 130 may extend from a rim around opening 103. For example, FIG. 1A shows four flanges extending radially from front face 102 spaced approximately 90° around circular opening 103. In other embodiments, fewer or more flanges may be present.

Figure 1B:
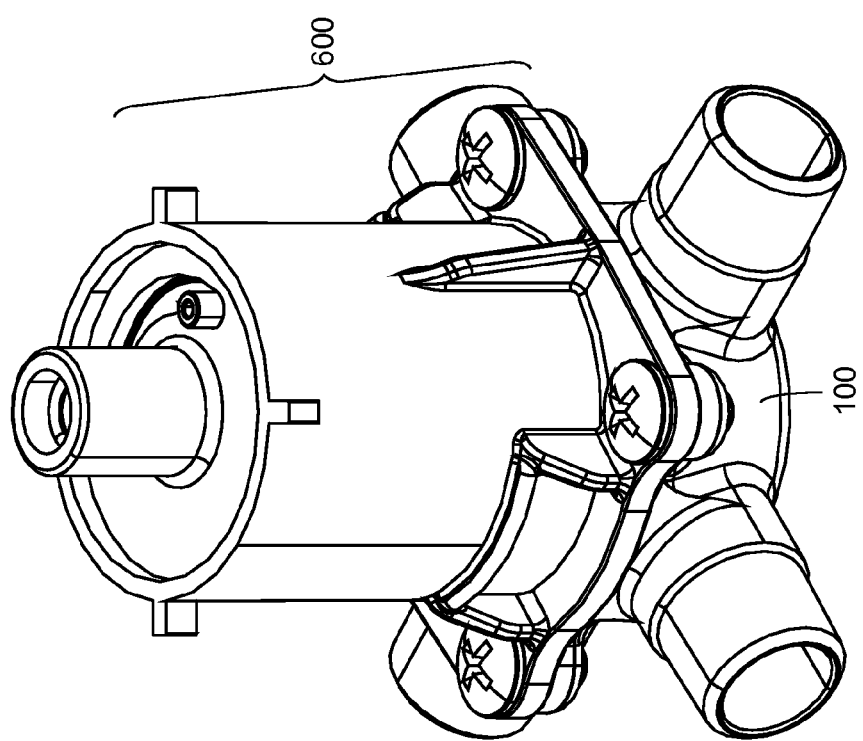
FIG. 1B is a perspective view of a valve cartridge attached to the universal valve body of FIG. 1A, according to an exemplary embodiment.

In some embodiments, front face 102 may further include one or more holes 132 in each flange 130. Holes 132 may be threaded or unthreaded and may extend completely through each flange 130 or partially through each flange 130. Holes 132 may exist in all flanges 130 or a subset thereof. Holes 132 may be configured to receive a screw, bolt, pin, clip, or other fastener. Holes 132 may be used for coupling a valve cartridge, a testing cap, or other cover to front face 102 over opening 103. For example, FIG. 1B shows a valve cartridge 600 secured to valve body 100 via screws inserted through holes 132. According to various embodiments, the valve cartridge 600 may include a pressure balance unit, a thermostatic control unit, or a combination thereof.

Referring again to FIG. 1A, universal valve body 100 may further include a rear face 104. In an exemplary embodiment, rear face 104 is circular and parallel to front face 102. However, in other embodiments rear face 104 may be rectangular, hexagonal, or any other regular or irregular shape. In some embodiments, rear face 104 may be solid, defining a closed surface of valve body 100. In other embodiments, rear face 104 may have one or more openings, inlets, outlets, or ports.

Still referring to FIG. 1A, universal valve body 100 may further include a side wall 106. Side wall 106 may connect front face 102 with rear face 104. In the exemplary embodiment shown in FIG. 1A, side wall 106 connects the perimeter of rear face 104 with the perimeter of circular opening 103. Side wall 106 may be frustoconical, cylindrical, curved, angled, or may include two or more flat surfaces lying in different planes (e.g., two or more planar walls). Side wall 106 may include one or more ports, inlets, outlets, or other openings through which fluid may enter or exit valve body 100.

Side wall 106 may have various angles of intersection relative to faces 102 and 104. In some embodiments, the angle of intersection may range from 60° to 90°. In more specific embodiments, the angle of intersection may range from 70° to 80°. In the exemplary embodiment shown in FIG. 1A, side wall 106 may intersect faces 102,104 at approximately a 75° angle. In other embodiments, the angle of intersection may range from 25° to 65°. In other more specific embodiments, the angle of intersection may range from 40° to 50°. In an exemplary embodiment, side wall 106 may intersect faces 102,104 at approximately a 45° angle. Advantageously, an increased angle of intersection may improve manufacturability of the inner surface of valve body 100 and allow for larger inlet and outlet ports. A reduced angle of intersection may advantageously allow a valve cartridge to be inserted into valve body 100 without sliding across the fluid ports or face 106, thereby avoiding potential damage (e.g., shearing, tearing, etc.) to seals on the valve cartridge. Both configurations are contemplated as exemplary embodiments.

Referring generally to FIGS. 1A-2B and 6, the angle of inclination of the sidewall 106 may form oblique inlet ports 112,114 and outlet ports 122,124 relative to the axes of the inlet channels 115,117 and outlet channels 122,124, described in more detail below. Having oblique inlet ports 112,114 and outlet ports 122,124 advantageously allows a sealing or clamping force to be applied between a valve cartridge or testing cap and the valve body 100, reduces or eliminates shearing or tearing forces across seals (see e.g., seals 356 in FIG. 6) between the valve cartridge or testing cap and the valve body 100 during installation, and reduces the complexity and manufacturing costs of the valve body 100.

In contrast, a conventional valve body has a sidewall substantially perpendicular to the rear face. If the inlet or outlet ports are on the rear face, a clamping force between the valve cartridge and the valve body may provide a good seal, but requires a complex manufacturing of the valve body to turn the water channel 90 degrees from the inlet and outlet connections to the rear face. If the inlet or outlet ports are on the sidewall, the complexity of manufacturing the valve body may be reduced; however, the forces coupling the valve cartridge to the valve body are normal to the inlet port and, therefore, do not provide sealing forces. Further, as the valve cartridge is inserted into the valve body, any seals around the inlets and outlets to the valve cartridge slide over the inlet and outlet ports of the valve body, which may shear, roll, dislodge, or tear the seal.

Figure 2A:
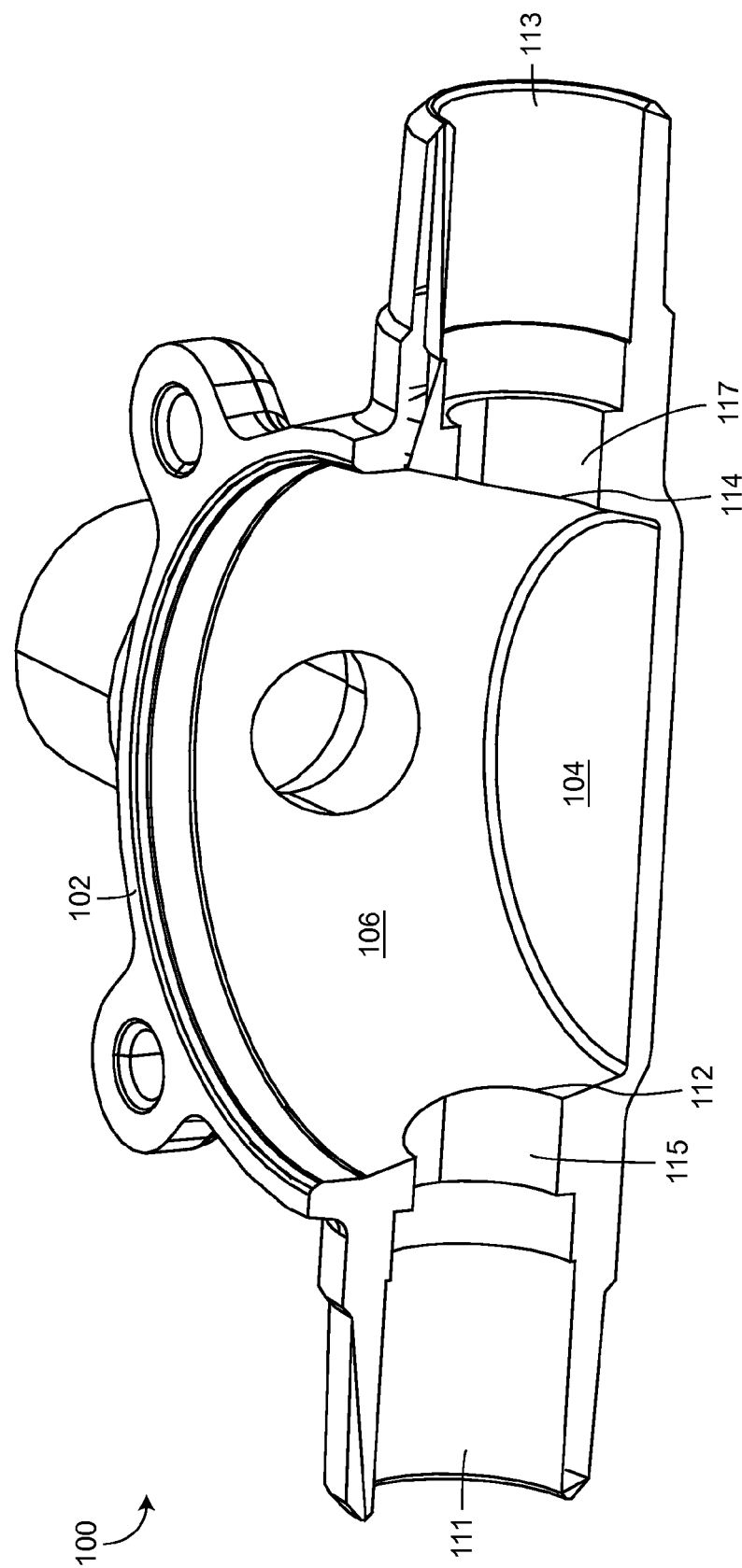
FIG. 2A is a half-sectional view of the valve body of FIG. 1A, illustrating inlet connections and inlet ports, according to an exemplary embodiment.

Referring now to FIG. 2A, a half sectional view of universal valve body 100 is shown, according to an exemplary embodiment. Universal valve body 100 is shown to include inlet connections 111,113. Inlet connections 111,113 may be configured to receive a pipe, tube, or other fluid guiding device for fluidly connecting valve body 100 with one or more fluid supply lines. For example, inlet connection 111 may receive a hot water supply line and inlet connection 113 may receive a cold water supply line. In an exemplary embodiment, inlet connections 111,113 may be positioned on opposite sides (e.g., 180° apart) of valve body 100.

In some embodiments, inlet connections 111,113 may be configured to surround a fluid supply pipe whereas in other embodiments inlet connections 111,113 may be configured to fit within a fluid supply pipe. Inlet connections 111,113 may be threaded or unthreaded and may accept a variety of differently shaped and sized pipes, tubes, or other fluid channels, including standard sized water supply pipes for residential or commercial plumbing use. In some embodiments, inlet connections 111,113 may include seals or o-rings to reduce leakage and ensure a watertight connection. In other embodiments, inlet connections 111,113 may be self-sealing (e.g., threaded, pressure fit, etc.) or may not include a sealing element.

Still referring to FIG. 2A, universal valve body 100 may further include inlet channels 115 and 117. Channels 115,117 may fluidly link inlet connections 111,113 with inlet ports 112,114. Inlet channels 115,117 may have circular cross-sectional areas projected in the direction of fluid flow. However, other cross-sectional shapes are possible. In an exemplary embodiment, channels 115,117 may have a reduced cross-sectional area relative to inlet connections 111,113.

As shown in FIG. 2A, the cross-sectional area of channels 115,117 may be reduced relative to inlet connections 111, 113. In some embodiments, the cross-sectional area of channels 115,117 may be greatly reduced relative to the cross-sectional area of inlet connections 111,113. In other embodiments, the cross-sectional area of channels 115,117 may be only slightly reduced. In other embodiments, the cross-sectional area may not be reduced at all, or even increased relative to inlet connections 111,113. Advantageously, a large cross-sectional area may result in increased flow through valve body 100. Inlet channels 115,117 may be substantially parallel to faces 102 and 104 and may intersect side wall 106 at various angles of intersection, depending on the inclination of side wall 106 relative to faces 102,104.

Still referring to FIG. 2A, universal valve body 100 may further include inlet ports 112 and 114. In an exemplary embodiment inlet ports 112,114 are obliquely disposed in frustoconical side wall 106. Ports 112,114 may have a circular or oval-shaped projected cross-sectional area in a direction parallel to inlet channels 115,117. However, due to the oblique intersection of channels 115,117 with side wall 106, ports 112,114 may have an elongated oval-shaped cross-sectional area in a direction transverse to side wall 106. Advantageously, this increased cross-sectional area may allow for an increased flow rate through valve body 100.

Figure 2B:
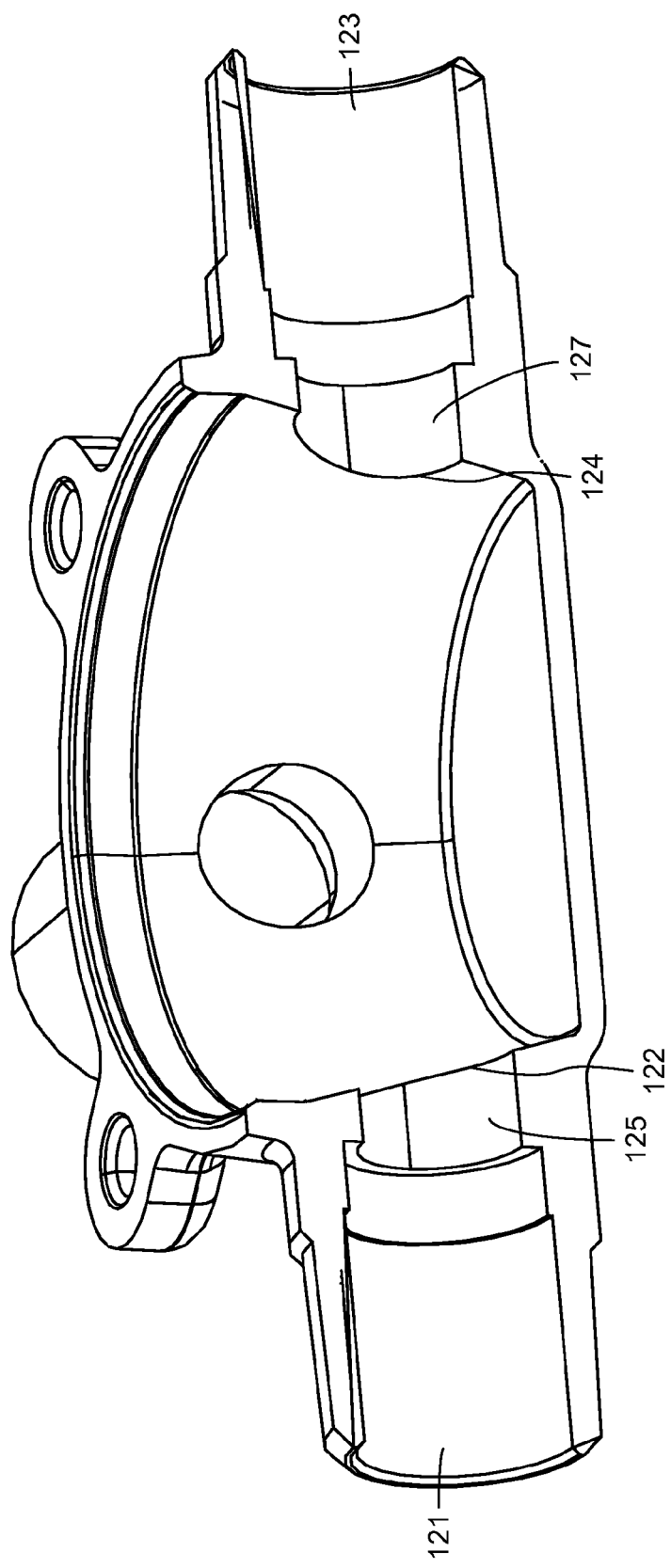
FIG. 2B is a half-sectional view of the valve body of FIG. 1A, illustrating outlet connections and outlet ports, according to an exemplary embodiment.

Referring now to FIG. 2B, universal valve body 100 may further include outlet ports 122,124, outlet channels 125, 127, and outlet connections 121,123. In some embodiments, outlet ports 122,124 may be obliquely disposed in side wall 106. Outlet ports 122,124 may have an angle of inclination relative to faces 102,104. The angle of inclination may be dependent on the angle of intersection of side wall 106 with faces 102,104. Outlet ports 122 may fluidly connect to outlet channel 125 whereas outlet port 124 may fluidly connect to outlet channel 127.

Outlet channels 125,127 may have a circular or oval-shaped cross-sectional area in the direction of fluid flow. However, other cross-sectional shapes are possible. In some embodiments, outlet channels 125,127 may have an increased cross-sectional area relative to inlet channels 115,117. The increased cross-sectional area may function to accommodate the fluids entering valve body 100 through both inlet channel 115 and inlet channel 117. In other words, the increased cross-sectional area may allow all of the fluid entering valve body 100 through inlet channel 115 and inlet channel 117 may exit through a single outlet channel 125 or 127. In other embodiments, outlet channels 125,127 may have an equal or substantially equal cross-sectional area relative to inlet channels 115,117. In further embodiments, the cross-sectional areas of channels 125,127 may be reduced relative to inlet channels 115,117. Outlet channels 125,127 may have a reduced cross-sectional area relative to outlet connections 121,123.

Outlet connections 121,123 may be configured to receive a pipe, tube, or other fluid guiding device for fluidly connecting valve body 100 with one or more fluid output lines. For example, outlet connection 121 may direct fluid flow to a first plumbing fixture (e.g., a tub faucet) whereas outlet connection 123 may direct fluid flow to a second plumbing fixture (e.g., a showerhead). In an exemplary embodiment, outlet connections 121,123 may be positioned on opposite sides (e.g., 180° apart) of valve body 100. In some embodiments, valve body 100 may include additional (e.g., a third, fourth, fifth, etc.) outlet connections disposed about a perimeter of valve body 100. An aspirator may be used to selectively direct fluid to either outlet connection 121 or outlet connection 123.

Figure 3A:
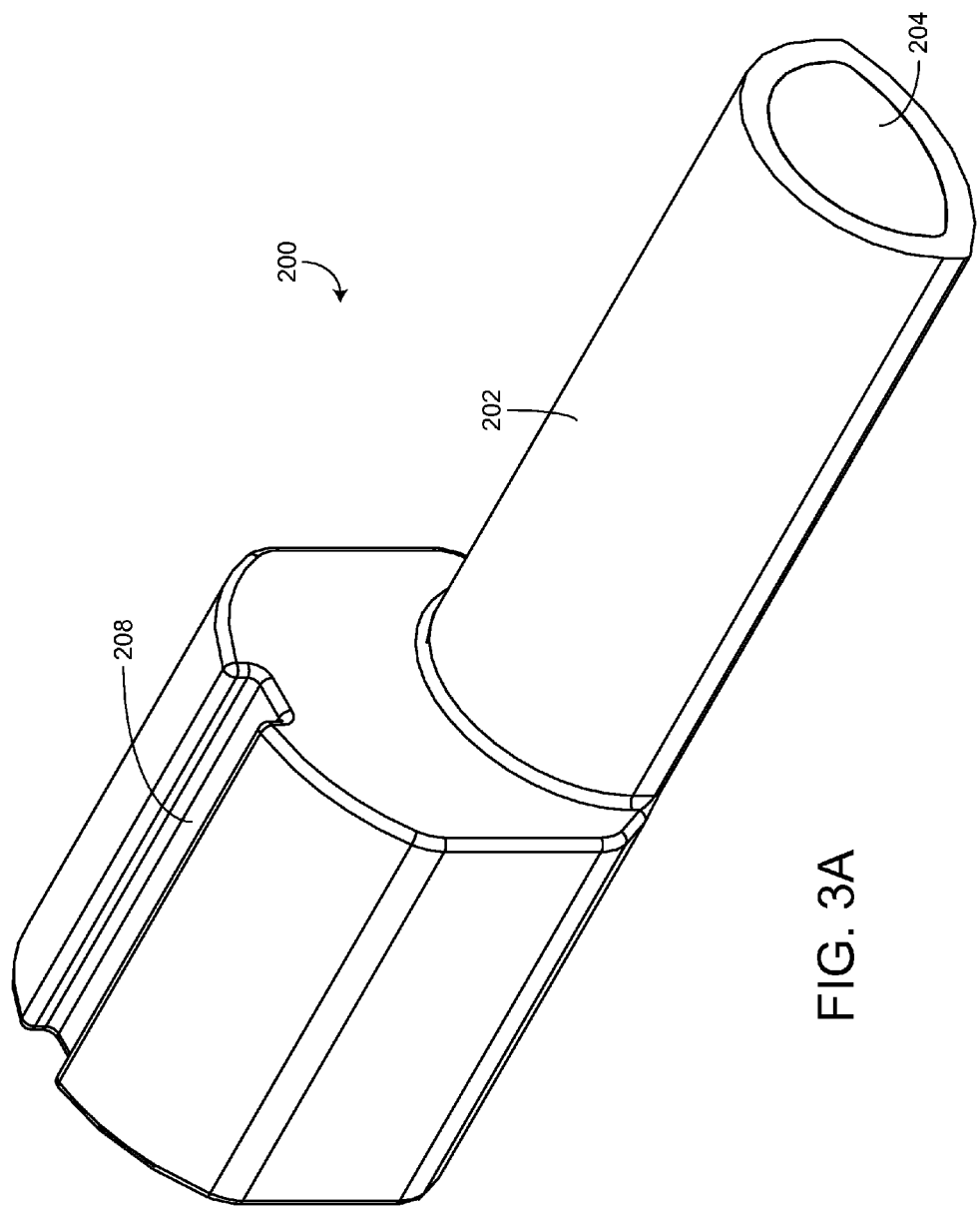
FIG. 3A is a perspective view of an aspirator for a valve assembly, according to an exemplary embodiment.
Figure 3B:
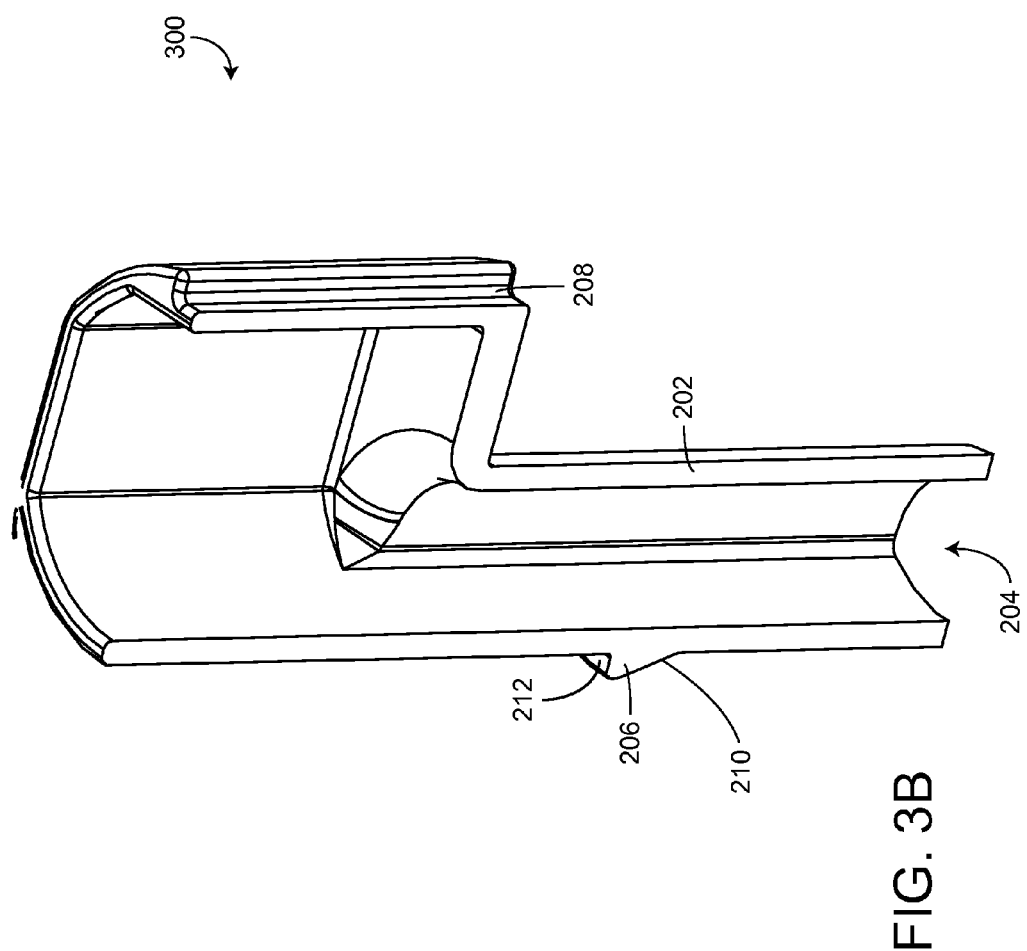
FIG. 3B is a half-sectional perspective view of the aspirator of FIG. 3A, according to an exemplary embodiment.
Figure 3C:
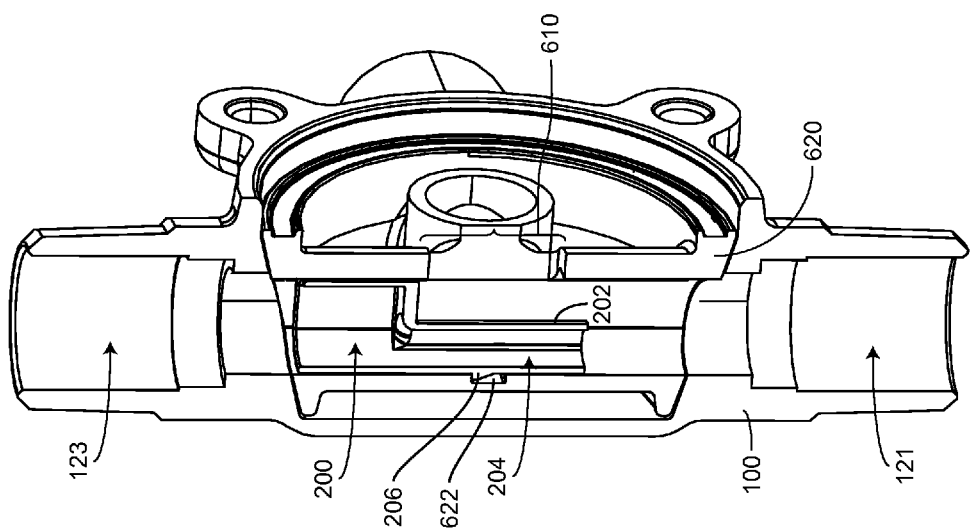
FIG. 3C is a half-sectional perspective view of the aspirator of FIG. 3A in an operating position within an end of a valve cartridge inserted into a valve body, according to an exemplary embodiment.

Referring now to FIGS. 3A-3B, a perspective view and a cross-sectional view of an aspirator 200 are shown, according to an exemplary embodiment. Aspirator 200 is shown to include an outer surface 202, a fluid channel 204, a peg 206, and a slot 208. Referring now to FIG. 3C, aspirator 200 may fit within an insert 620. Insert 620 may be inserted into valve body 100 as shown. Insert 620 may be part of a fluid control cartridge 600 as shown in FIG. 1B. Cartridge 600 may be used to control the temperature and/or volume flow rate of a fluid through an outlet port of valve body 100. Cartridge 600 may attach to valve body 100 as shown in FIG. 1B. It is contemplated that different inserts 620 may be used for different configurations of the fluid control cartridge 600. For example, the specific configuration of the fluid pathways through the insert 620 may vary depending on, for example, whether the fluid control cartridge 600 includes a pressure balance unit or a thermostatic control unit, the volumetric flow rate of a particular fluid control cartridge 600, etc.

Referring again to FIG. 3C, aspirator 200 may receive fluid in a direction perpendicular to surface 202 through an opening 610 in insert 620. Aspirator 200 may direct the fluid toward outlet connection 121 in universal valve body 100. In operation, outlet connection 121 may be fluidly connected to a bathtub faucet. Therefore, in some embodiments, aspirator 200 may initially direct fluid toward the bathtub faucet. However, if the bathtub faucet is closed (e.g., by a user actuating a diverter valve in order to take a shower), such closure may cause the fluid to back up and inhibit the fluid from exiting universal valve body 100 through outlet connection 121. In this situation, the fluid passes through channel 204 of the aspirator 200 and out of valve body 100 via outlet connection 123. Outlet connection 123, in turn, may be fluidly connected to a shower head.

Aspirator 200 may be injection molded from a polymer such as Noryl, PVC or ABS. In some embodiments, glass fibers may be added to the polymer prior to injection molding. In other embodiments, aspirator 200 may be made other materials such as metals, ceramics, or other polymers and may be formed using other casting, molding, sculpting, or assembly processes. In an exemplary embodiment, aspirator 200 is injection molded into a single piece. However, in other embodiments, aspirator may be assembled from several separate pieces. Advantageously, aspirator 200 may be manufactured separately from valve body 100 or insert 620 and subsequently inserted into an operating position.

Peg 206 or slot 208 may be configured to engage a corresponding component of insert 620 for securing aspirator 200 in an operating position within valve cartridge 600. In some embodiments, peg 206 or slot 208 may releasably couple aspirator 200 to valve cartridge 600. For example, peg 206 may be received in a recess 622 in the insert 620, and the slot 208 may receive a ridge in the insert 620. The interaction of the peg 200 and the recess 622 may constrain longitudinal or axial movement of the peg 206 relative to the insert 620. The interaction of the slot 208 and the ridge may constrain rotational movement, and may align the aspirator 200 circumferentially, relative to the insert 620. The peg 206 may include an inclined surface, shown as wedge 210, that facilitates insertion of the aspirator 200 into the insert 620 (e.g., by gradually deflecting the aspirator 200 as it is inserted into the insert 620). The wedge 210 may also facilitate removal of the aspirator 200 from the insert 620. For example, if the aspirator 200 is mistakenly installed upside down, additional force may be applied to push the aspirator 200 through the insert 620, and the wedge 210 enables deflection of the aspirator 200 so that the peg 206 may exit the recess 622. A ledge 212 on the reverse (e.g., top) side of the peg 206 prevents a properly installed peg 206 from dislodging from the recess 622 in an upward direction, for example, by fluid pressure through opening 610 or fluid pressure from closing the diverter valve to force fluid up through the aspirator 200 through outlet connection 123.

According to the embodiment shown in FIG. 3C, an end of the aspirator 200 is substantially flush to the outer surface of the insert 620 when the aspirator 200 is in an installed position. Accordingly, if the aspirator 200 is not fully installed into the insert 620 prior to installation of the insert 620 into the valve body 100, installation of the insert 620 into the valve body 100 will push the aspirator 200 into a fully installed position. This may be facilitated by the sloped or conical angle of the side wall 106 of the valve body 100.

Advantageously, aspirator 200 may selectively couple to valve cartridge 600 in any of a plurality of orientations. For example, aspirator 200 may be removed from valve cartridge 600, rotated 180°, and re-inserted into valve cartridge 600 in the new orientation. This ability allows valve cartridge 600 to be installed in a different orientation (e.g., rotated 180°) relative to valve body 100 while maintaining aspirator 200 in the same orientation relative to the valve body 100. For example, in the case of back-to-back showers on opposite sides of a shared wet wall, the directions in which the hot and cold water supply lines approach valve body 100 are reversed for one of the valve bodies. Rather than re-plumbing the hot and cold water lines for one of the valve bodies, valve cartridge 600 may be rotated by 180° to allow conventional operation of the valve (e.g., such that cold water enters through a first inlet port and hot water enters through a second inlet port). However, if aspirator 200 were permanently attached to the valve cartridge, such rotation would cause aspirator 200 to be upside down, thereby introducing the possibility that aspirator 200 may not function properly. The ability to install aspirator 200 in multiple orientations may allow aspirator 200 to be removed from the valve cartridge, rotated into proper orientation (e.g., by 180°) to accommodate different installations, and re-inserted into the valve cartridge. Alternative solutions, such as forming the aspirator in the valve body require more complex manufacturing processes.

Figure 4:
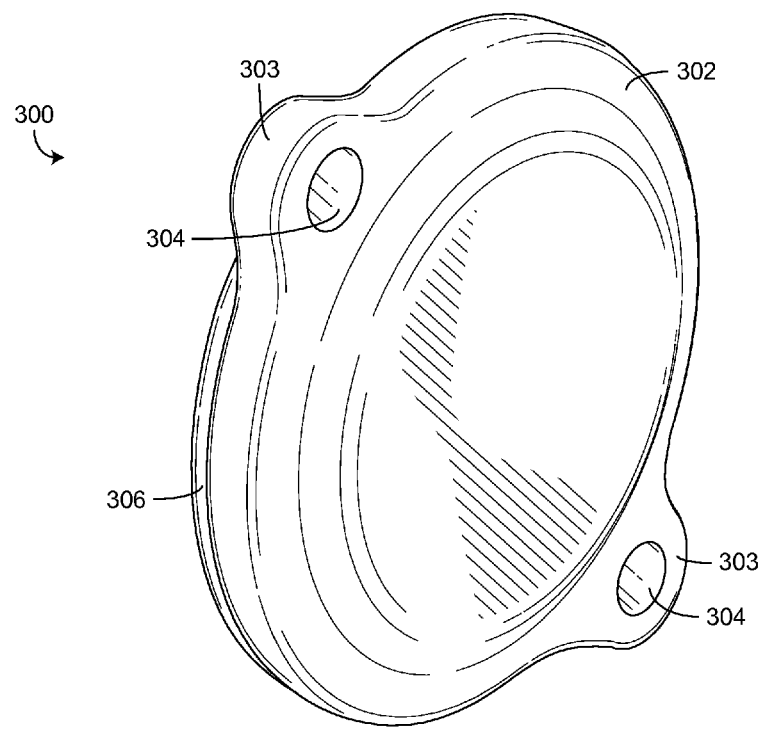
FIG. 4 is a perspective view of a cap for covering an opening in the valve body of FIG. 1A, according to an exemplary embodiment.

Referring now to FIG. 4, a cover for a valve assembly (e.g., testing cap, shipping cap, etc.), shown as a cap 300, is shown, according to an exemplary embodiment. Cap 300 may include a base 302, flanges 303, holes 304, and in some embodiments, a seal 306. In an exemplary embodiment, cap 300 may be injection molded from a polymeric material. However, in other embodiments, cap 300 may be made of metals, ceramics, or any other suitable material. Cap 300 may be configured to fit over opening 103 in valve body 100 in the absence of a valve cartridge. Cap 300 may allow valve body 100 to be installed in an operable plumbing system prior to installation of the valve cartridge (e.g., during construction, renovation, remodeling, etc.). With cap 300 in place, water pressure may be supplied to valve body 100 without causing flooding from circular opening 103. Cap 300 may allow fluid to flow through valve body 100 (e.g., via inlet connections 111,113 and outlet connections 121, 123) in order to flush construction debris out of the plumbing system or to allow continued operation of an existing plumbing system prior to installing a valve cartridge.

In some embodiments, cap 300 may permit fluid from inlet connections 111,113 to mix within valve body 100. In other embodiments, cap 300 may include a dividing wall (e.g., a rib, seal, barrier, etc.) to prevent cross flow within valve body 100. For example, cap 300 may direct fluid from inlet connection 111 exclusively to outlet connection 121 or outlet connection 123. Similarly, cap 300 may direct fluid from inlet connection 113 exclusively to outlet connection 123 or outlet connection 121. The dividing wall may divide valve body 100 into two pairs of fluidly connected inlets and outlets.

Still referring to FIG. 4, cap 300 may include a base 302. In an exemplary embodiment, base 302 may be substantially circular to cover circular opening 103 in valve body 100. However, in other embodiments, base 302 may have other shapes designed to fit over differently shaped openings. Base 302 may be flat (e.g., disc-shaped) or may have one or more curves, angles, or extrusions. In some embodiments, base 302 may include a seal 306 along an outer perimeter of the base. Seal 306 may form a watertight barrier between cap 300 and valve body 100 when cap 300 is positioned over opening 103.

In some embodiments, cap 300 may include flanges 303. Flanges 303 may extend radially from base 302 along an outer perimeter thereof. For example, FIG. 4 shows two flanges 303 spaced approximately 180° around base 302. In other embodiments, fewer or more flanges may be present. Flanges 303 may provide a flat surface for interfacing, aligning, or fastening cap 300 with valve body 100 or any other component.

In some embodiments, cap 300 may further include one or more holes 304 in each flange 303. Holes 304 may be threaded or unthreaded and may extend completely through each flange 303 or partially through each flange 303. Holes 304 may exist in all flanges 303 or a subset thereof. Holes 304 may be configured to receive a screw, bolt, pin, or other fastener. Holes 304 may be used for coupling cap 300 to valve body 100. In other embodiments, cap 300 may be secured or attached valve body 100 using any other fastening means including adhesive compounds, clamps, magnets, or any other suitable fastener.

Figure 5:
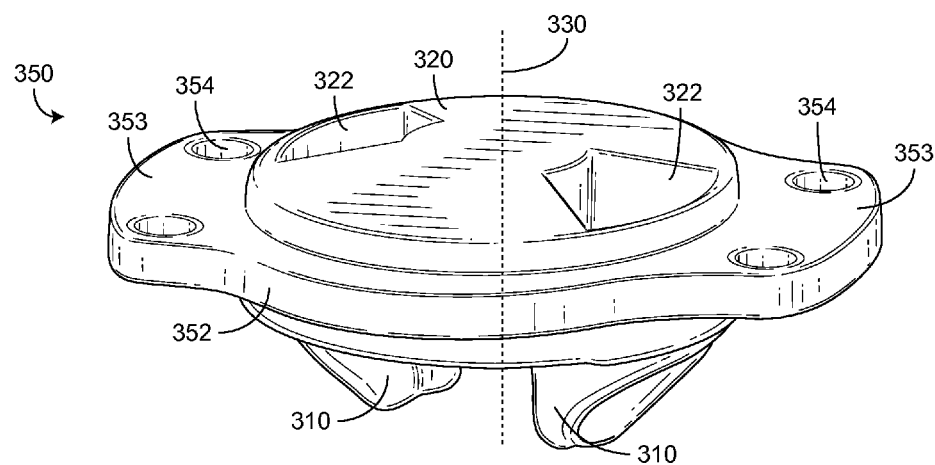
FIG. 5 is a perspective view of the cap of FIG. 4 showing supplemental features including additional holes, an extended flange, and a structure extending from the base, according to an exemplary embodiment.

Referring now to FIG. 5, another embodiment of a cover for a valve assembly, shown as a cap 350, is shown, according to an exemplary embodiment. Cap 350 is shown to include a base 352, flanges 353 extending radially from base 353, and holes 354 extending through flanges 353. Cap 350 is further shown to include a structure 310 extending from one side of base 352 and a dial 320 opposite structure 310. In the exemplary embodiment, flanges 353 may encompass a larger arc length around the perimeter of base 352 and have more holes 354 relative to cap 300. Holes 354 may be used to secure cap 350 to valve body 100 in a plurality of positions. Holes 354 may be spaced less than 90° apart. The angular spacing between holes 354 may be based on the circumferential width of structure 310.

According to another embodiment of a cover for a valve assembly, the cover may includes a base having flanges extending radially from the base and holes extending axially through the flanges. Two channels may be coupled to an underside of the cover. The first of the two channels may be configured to seal against and extend between a first inlet port 112 of the valve body and one of the outlet ports 122,124 of the valve body. The second of the two channels may be configured to seal against and extend between the second inlet port 114 of the valve body and the other of the outlet ports 122,124 of the valve body. Accordingly, fluid may be directed through the cover, flushing the pipes, while preventing fluid from the first and second inlet ports 112,114 from mixing (e.g., preventing cross-flow between hot and cold water sources).

Figure 6:
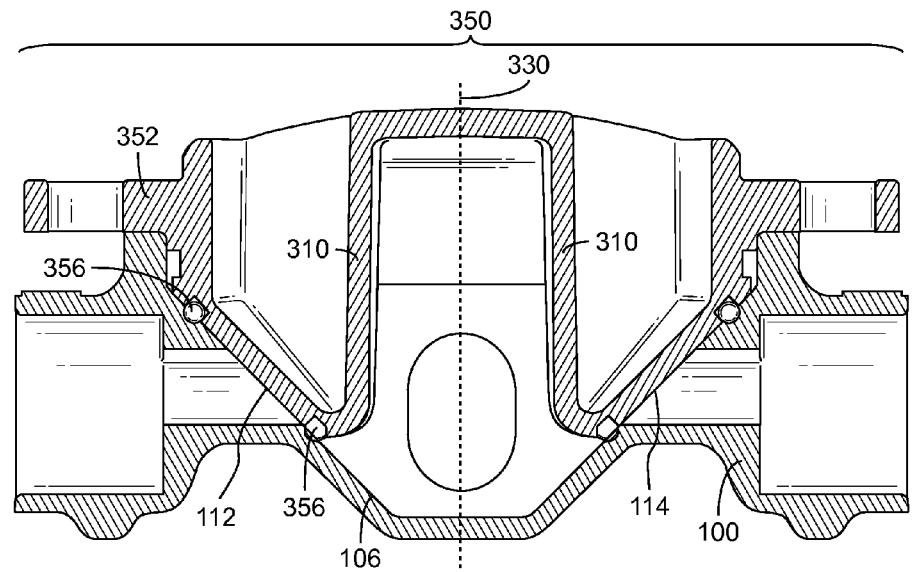
FIG. 6 is a half-sectional elevation view of the cap of FIG. 5 inserted into a valve body and covering the inlet ports, according to an exemplary embodiment.

Referring now to FIG. 6, a half-sectional view of cap 350 is shown inserted over valve body 100, according to an exemplary embodiment. Cap 350 is shown to include a structure 310 extending from base 352 into valve body 100. In some embodiments, structure 310 may include an angled portion tapering inward toward a central axis 330 of cap 350 (e.g. a transverse axis passing through a midpoint of cap 350) as structure 310 extends from base 352. Structure 310 may be configured to align with an inner wall (e.g., wall 106) of valve body 100 when cap 350 is secured to the valve body 100. For example, the angle of the angled portion of the structure 310 may be the same or substantially equal to the angle of inclination of the sidewall 106 of the valve body 100. In some embodiments, structure 310 may have a frustoconical portion configured to align with a frustoconical portion of valve body 100.

When cap 300 is secured to valve body 100, structure 310 may cover (e.g., block, seal, obstruct, etc.) at least one of inlet ports 112,114 or outlet ports 122,124, thereby preventing fluid flow through valve body 100. Such installations of the structure 310 may allow a pressure decay test of the plumbing system to be performed for identifying leaks in the plumbing system before installing a valve cartridge. In some embodiments, structure 310 may include seals 356 which surround at least one of inlet ports 112,114 or outlet ports 122,124 when structure 310 covers said ports.

In some embodiments, cap 350 may attach to valve body 100 in a first position using a first subset of holes 354. In the first position, structure 310 may not block any of inlet ports 112,114 or outlet ports 122,124, thereby allowing fluid to flow through valve body 100. Cap 350 may be removable from valve body 100 and re-attachable in a second position using a second subset of holes 354. In the second position, structure 310 may block at least one of inlet ports 112,114 or outlet ports 122,124, thereby preventing fluid flow through valve body 100.

Referring again to FIG. 5, in some embodiments, cap 350 may further include a dial 320. Dial 320 may extend from cap 350 on a side opposite structure 310. Dial 320 may include indentations 322 into which a user may insert a tool or his or her fingers. Dial 320 may be fixed to base 352 or rotatable (e.g., by a user) about axis 330 relative to base 352. In some embodiments, dial 320 may be coupled to structure 310 such that rotation of dial 320 causes rotation of structure 310 about axis 330. Dial 320 may allow a user to cover or uncover ports 112,114 or 122,124 by turning dial 320 without requiring cap 350 to be removed and reattached in a different orientation. Dial 320 may be used to switch cap 350 between a first position in which fluid is allowed to flow through valve body 100 and a second position in which fluid is blocked from flowing through valve body 100.

Figure 7:
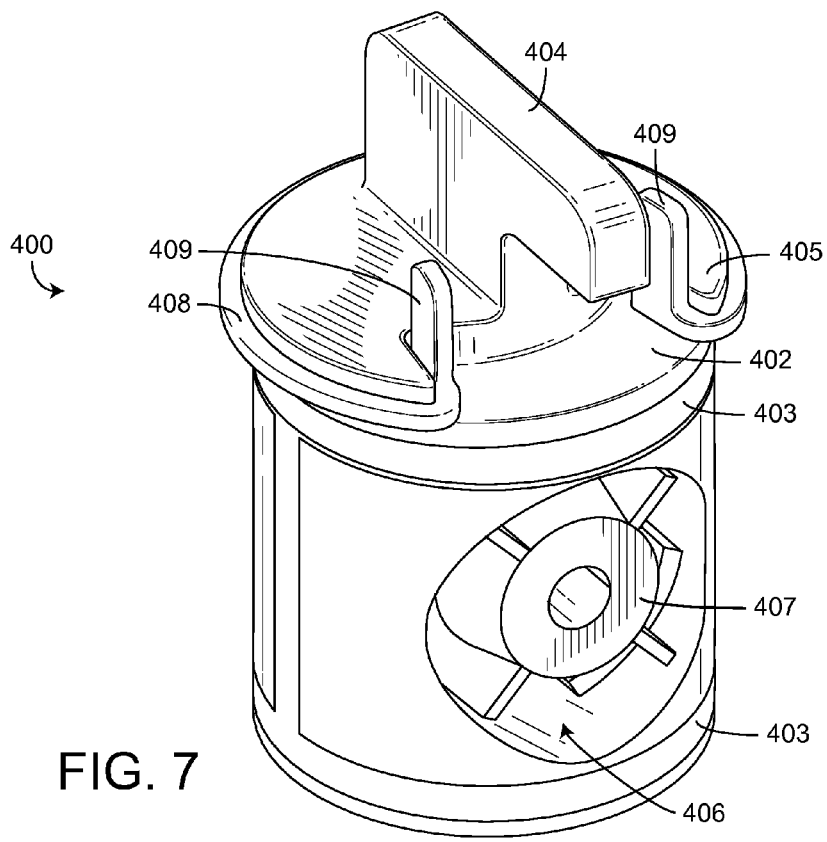
FIG. 7 is a perspective view of a service valve, according to an exemplary embodiment.
Figure 8:
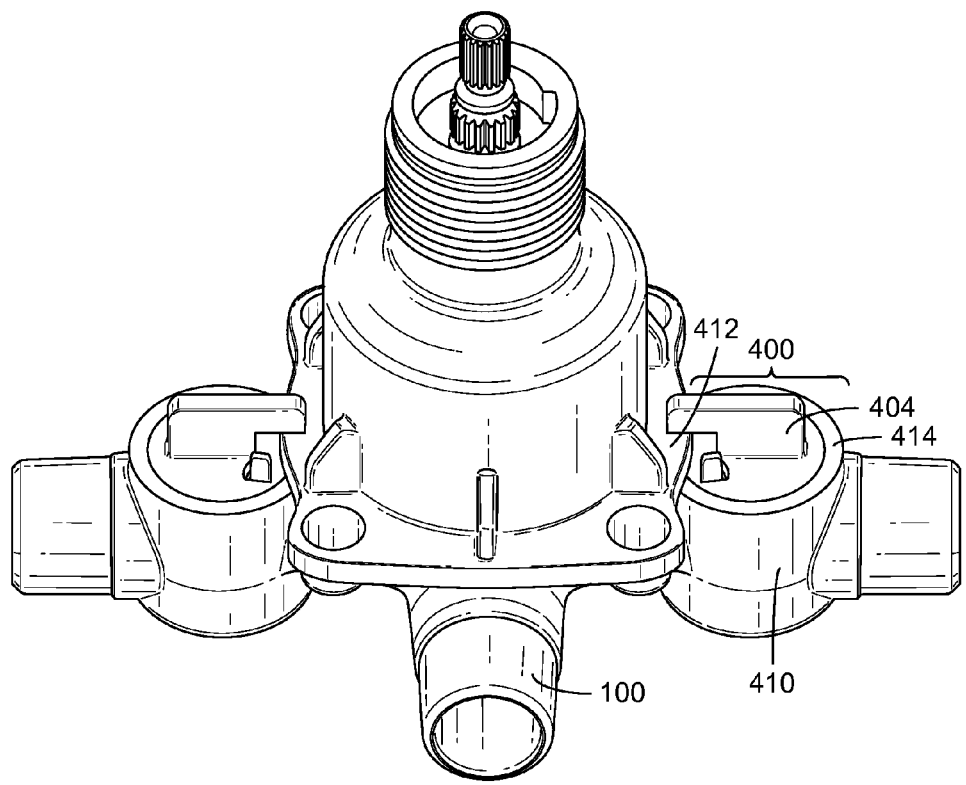
FIG. 8 is a perspective view of the service valve of FIG. 7 inserted into a valve assembly, thereby preventing removal of a valve cartridge, according to an exemplary embodiment.

Referring now to FIGS. 7 and 8, a service valve (e.g., a check valve, a stop valve, a stop-check valve, etc.), shown as check valve 400, for a valve assembly is shown, according to an exemplary embodiment. Check valve 400 may allow a user to stop fluid flow to valve body 100 without discontinuing the fluid supply to the rest of a plumbing system. For example, check valve 400 may be installed immediately upstream of valve body 100 in inlet connections 111,113 (as shown in FIG. 8) or a fluid supply line fluidly connected to one of to inlet connections 112,114 (as shown in FIG. 8). A user may manipulate check valve 400 to stop fluid flow to valve body 100 without affecting other plumbing fixtures (e.g., other faucets, sinks, showers, tubs, etc.) connected to the plumbing system. In an exemplary embodiment, check valve 400 may include a base 402, seals 403, a tab 404, a lip 405, a bore 406, and a retaining clip 408.

Still referring to FIG. 7, base 402 may be substantially cylindrical and may include one or more seals 403 around the circular ends thereof. Seals 403 may prevent fluid from leaking around base 402 when installed upstream of valve body 100. Base 402 may be rotatable between an open orientation and a closed orientation relative to valve body 100. In some embodiments, base 402 may be rotated between the open orientation and the closed orientation by rotating base 402 by approximately 90° or 180° (e.g., about a quarter-turn or about a half-turn). Being able to open and close the service valve proximate the valve body 100 facilitates installation and repair of the valve body, fluid control valve, and plumbing fixtures (e.g., shower, spout, faucet, etc.).

In some embodiments, bore 406 may be substantially cylindrical, defining a fluid path through base 402. In some embodiments, check valve 400 may further include a unidirectional valve 407 inserted into bore 406. Valve 407 may allow fluid to pass through bore 406 in one direction but prevent fluid from passing through bore 406 in the opposite direction. Valve 407 may protect against cross flow (e.g., fluid from one fluid supply line entering another fluid supply line) or reverse flow by preventing fluid inside valve body 100 from exiting through one of inlet ports 112,114. In other embodiments, rotating the base 402 approximately a quarter-turn aligns the bore 406 substantially perpendicular to the flow of fluid, thereby closing the path of fluid through the valve 400.

Still referring to FIG. 7, tab 404 may extend outward from a circular face of base 402 and radially away from a longitudinal axis of base 402. Tab 404 may extend radially past the perimeter of the circular face from which tab 404 branches. In some embodiments, tab 404 may be directionally aligned with bore 406. Tab 404 may further be aligned with unidirectional valve 407 such that tab 404 extends radially in the same direction that fluid is allowed to flow through valve 407.

Still referring to FIG. 7, lip 405 may extend radially from base 402 past the curved circumferential wall of base 402. Lip 405 may be part of an additional layer coupled to base 402 or may be an extension of base 402 past the circumferential side wall.

Referring now to FIG. 8, check valve 400 is shown installed into recess 410 within a valve body 100, according to an exemplary embodiment. Valve 400 is shown with base 402 in the open orientation in which fluid may flow into valve body 100. Advantageously, when base 402 is in the open orientation, tab 404 may extend over a cover 412 on the valve body. Cover 412 may be a testing cap such as cap 300 or a valve cartridge as shown in FIG. 8. When base 402 is in the open orientation, cover 412 may be held between valve body 100 and tab 404, thereby preventing removal of cover 412 from valve body 100 while the valve 400 is open (e.g., allowing fluid flow therethrough). A user wishing to remove cover 412 may be required to rotate base 402 and tab 404 into the closed orientation before cover 412 may be removed. Rotation of base 402 and tab 404 into the closed orientation may be accomplished by rotating base 402 (e.g., by 90, 180, etc. degrees) relative to valve body 100. The unidirectionality of valve 407 may prevent fluid from entering valve body 100 notwithstanding the fluid alignment of bore 406.

Figure 9:
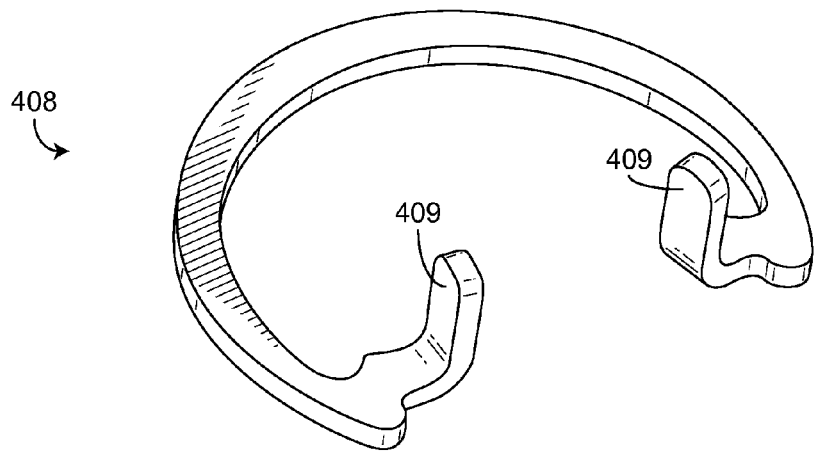
FIG. 9 is a perspective view of a retaining clip for the service valve of FIG. 7, according to an exemplary embodiment.

Referring now to FIG. 9, check valve 400 may further include a retaining clip 408. Retaining clip 408 may be generally arc-shaped, comprising a portion of a circle, oval, or other curve. The shape of retaining clip 408 may be configured to match the shape of base 402. Retaining clip 408 and may include tabs 409 extending from both endpoints of the arc in a direction transverse to a plane defined by the arc. In some embodiments, retaining clip 408 may be compressible between a compressed state and an expanded state. Retaining clip 408 may be compressed by exerting a force on one or both of tabs 409, directed toward the other tab 409. In other words, retaining clip 408 may be compressed by pinching together tabs 409. A user may compress retaining clip 408 by gripping tabs 409 with a pair of pliers, fingers, or other gripping element. Tabs 409 may be aligned with tab 404 such that a user may grip both tabs 404 and 409 simultaneously. Once the compression force is removed, retaining clip 408 may have sufficient elasticity to automatically return to the expanded state.

Referring again to FIG. 7, retaining clip 408 may be configured to fit in a space between lip 405 and base 402. When retaining clip 408 is in the expanded state, retaining clip 408 may extend radially past the circular perimeter of base 402. When check valve 400 is inserted into recess 410 (as shown in FIG. 8), retaining clip 408 may fit under a lip 414 around an upper perimeter of recess 410. When in the expanded state, clip 408 may prevent removal of valve 400 from recess 410 by engaging lip 414. However, when retaining clip 408 is in the compressed state, check valve 400 may be removed from recess 410. For example, a user wishing to remove check valve 400 from recess 410 may compress tabs 409 together (e.g., using a pair of ordinary pliers). Compression of tabs 409 may cause retaining clip 408 to shrink in diameter (e.g., to a size less than the diameter of lip 414), thereby allowing check valve 400 to be removed from recess 410.

According to another embodiment, when retaining clip 408 is in an expanded state, the clip 408 engages (e.g., frictionally, radial force, etc.) an inner surface of recess 410. Such engagement inhibits rotation of the clip 408 relative to the valve body. In turn, the clip 408 may inhibit rotation of the base 402 relative to the valve body by frictionally engaging the base 402, by one or more of tabs 409 engaging a recess in lip 405, or by one or more of tabs 409 engaging the tab 404. Preventing rotation of the base 402 relative to the valve body may prevent unintentional shutoff when the valve is in an open orientation, or unintentional turning on when the valve is in a closed orientation.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A testing cap for a valve body, the testing cap comprising:
   a base configured to releasably attach to the valve body and to cover an opening in the valve body, wherein the opening is configured to receive a valve cartridge and the base covers the opening in place of the valve cartridge;
   a structure extending from a first side of the base, wherein the structure is located within the valve body when the base is attached to the valve body and configured to be oriented relative to the valve body in multiple different orientations comprising a first orientation and a second orientation; and
   a dial located on a second side of the base opposite the first side, the dial comprising indentations in a portion of the dial accessible outside the valve body, the indentations extending through the base and into hollow regions within the structure on the first side of the base such that each of the hollow regions is open to one of the indentations in the dial;
   wherein the structure allows fluid to enter the valve body through an inlet port in the valve body and exit the valve body through an outlet port in the valve body when the structure is oriented in the first orientation;
   wherein the structure comprises a wall having a first surface that defines a boundary of at least one of the hollow regions within the shell and a second surface, opposite the first surface, that covers at least one of the inlet port or the outlet port when the structure is oriented in the second orientation, thereby preventing fluid flow through the valve body, wherein at least one of the hollow regions is aligned with at least one of the inlet port or the outlet port.

2. The testing cap of claim 1, wherein the structure is configured to align with an inner wall of the valve body when the base is attached to the valve body.

3. The testing cap of claim 2, wherein the structure comprises a frustoconical portion configured to align with a frustoconical side wall of the valve body when the base is attached to the valve body.

4. The testing cap of claim 1, further comprising:
flanges extending radially outward from the base; and
holes extending through the flanges and configured to align the base to the valve body for releasably coupling the base to the valve body.

5. The testing cap of claim 4, wherein the holes comprise a first set of holes configured to align the base to the valve body in the first orientation and a second set of holes configured to align the base to the valve body in the second orientation.

6. The testing cap of claim 1, wherein the structure is fixed to the base and reorienting the structure relative to the valve body comprises removing the base from the valve body and reattaching the base to the valve body in a different orientation.

7. The testing cap of claim 1, wherein the dial extends through the base and is configured to rotate relative to the base about a central axis, the dial comprising a portion inside the valve body and a portion accessible outside the valve body when the base is attached to the valve body.

8. The testing cap of claim 7, wherein the indentations are configured to facilitate rotating the dial from outside the valve body.

9. The testing cap of claim 7, wherein the structure is fixed to the dial and reorienting the structure relative to the valve body comprises rotating the dial and the structure about the central axis without removing the base from the valve body.

10. The testing cap of claim 1, wherein the structure comprises:
a first fluid channel configured to seal against and extend between a first inlet port of the valve body and a first outlet port of the valve body; and
a second fluid channel configured to seal against and extend between a second inlet port of the valve body and a second outlet port of the valve body;
wherein the fluid channels direct a first fluid from the first inlet port to the first outlet port and a second fluid from the second inlet port to the second outlet port, through the valve body, while preventing the first and second fluids from mixing.

11. A testing cap for a valve body, the testing cap comprising:
a base having a first orientation and a second orientation relative to the valve body;
a first portion of the base configured to align the base to the valve body for releasably coupling the base to the valve body in the first orientation;
a second portion of the base configured to align the base to the valve body for releasably coupling the base to the valve body in the second orientation;
a structure extending from a first side of the base, wherein the structure is located within the valve body when the base is attached to the valve body; and
a dial located on a second side of the base opposite the first side, the dial comprising indentations in a portion of the dial accessible outside the valve body, the indentations extending through the base and into hollow regions within the structure on the first side of the base such that each of the hollow regions is open to one of the indentations in the dial;
wherein the structure allows fluid to enter the valve body through an inlet port in the valve body and exit the valve body through an outlet port in the valve body when the base is coupled to the valve body in the first orientation;
wherein the structure comprises a wall having a first surface that defines a boundary of at least one of the hollow regions within the shell and a second surface, opposite the first surface, that covers at least one of the inlet port or the outlet port when the base is coupled to the valve body in the second orientation, thereby preventing fluid flow through the valve body, wherein at least one of the hollow regions is aligned with at least one of the inlet port or the outlet port.

12. The testing cap of claim 11, wherein the structure is configured to align with an inner wall of the valve body when the base is attached to the valve body.

13. The testing cap of claim 12, wherein the structure comprises a frustoconical portion configured to align with a frustoconical side wall of the valve body when the base is attached to the valve body.

14. The testing cap of claim 11, further comprising:
flanges extending radially outward from the base; and
holes extending through the flanges and configured to align the base to the valve body for releasably coupling the base to the valve body.

15. The testing cap of claim 14, wherein the holes comprise a first set of holes configured to align the base to the valve body in the first orientation and a second set of holes configured to align the base to the valve body in the second orientation.

16. The testing cap of claim 11, wherein the structure is fixed to the base and reorienting the structure relative to the valve body comprises removing the base from the valve body and reattaching the base to the valve body in a different orientation.

17. The testing cap of claim 11, wherein the dial extends through the base and is configured to rotate relative to the base about a central axis, the dial comprising a portion inside the valve body and a portion accessible outside the valve body when the base is attached to the valve body.

18. The testing cap of claim 17, wherein the indentations are configured to facilitate rotating the dial from outside the valve body.

19. The testing cap of claim 17, wherein the structure is fixed to the dial and reorienting the structure relative to the valve body comprises rotating the dial and the structure about the central axis without removing the base from the valve body.

20. The testing cap of claim 11, wherein the structure comprises:
a first fluid channel configured to seal against and extend between a first inlet port of the valve body and a first outlet port of the valve body; and
a second fluid channel configured to seal against and extend between a second inlet port of the valve body and a second outlet port of the valve body;
wherein the fluid channels direct a first fluid from the first inlet port to the first outlet port and a second fluid from the second inlet port to the second outlet port, through the valve body, while preventing the first and second fluids from mixing.

* * * * *